(12) United States Patent  
Brown et al.

(10) Patent No.: US 6,616,346 B1
(45) Date of Patent: Sep. 9, 2003

(54) FIBER TO OPTICAL DEVICE ALIGNMENT

(75) Inventors: Robert E. Brown, Boca Raton, FL (US); Jeffrey E. Leclaire, Boca Raton, FL (US); John L. Sullivan, Boca Raton, FL (US); Huizong Lu, Coral Springs, FL (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 09/928,148

(22) Filed: Aug. 10, 2001

Related U.S. Application Data

(60) Provisional application No. 60/224,735, filed on Aug. 11, 2000.

(51) Int. Cl.[7] .............................................. G02B 6/36
(52) U.S. Cl. ........................... 385/90; 385/39; 385/49; 385/88; 385/91; 385/52; 385/134; 385/136; 385/137
(58) Field of Search ............................ 385/88, 90, 91, 385/147, 134, 52, 39, 49, 136, 137

(56) References Cited

U.S. PATENT DOCUMENTS

| | | | | |
|---|---|---|---|---|
| 4,707,070 A | * | 11/1987 | Wagoner | 385/139 |
| 4,854,667 A | * | 8/1989 | Ebata et al. | 385/134 |
| 5,030,265 A | * | 7/1991 | Suzuki et al. | 385/15 |
| 5,559,915 A | * | 9/1996 | Deveau | 385/49 |
| 5,914,207 A | * | 6/1999 | Nishiki et al. | 430/22 |
| 6,253,011 B1 | * | 6/2001 | Haake | 385/14 |
| 6,279,353 B1 | * | 8/2001 | Wada et al. | 65/36 |
| 6,307,617 B1 | * | 10/2001 | Nishiki et al. | 355/53 |
| 6,325,551 B1 | * | 12/2001 | Williamson, III et al. | 385/147 |
| 6,435,735 B1 | * | 8/2002 | Ramsey | 385/90 |
| 6,471,419 B1 | * | 10/2002 | Hall et al. | 385/91 |

* cited by examiner

*Primary Examiner*—Brian Healy
*Assistant Examiner*—Daniel Petkovsek
(74) *Attorney, Agent, or Firm*—Fish & Richardson P.C.

(57) ABSTRACT

An apparatus for aligning a fiber to an optical device includes a base, a fiber holder mounted on the base, the fiber holder holding the fiber during operation of the apparatus, a first movable stage mounted on the base, the first movable stage holding the optical device during operation of the apparatus, a second movable stage mounted on the base, wherein the second movable stage is configured to move parallel to the first movable stage, a fiber positioner attached to the second movable stage, and a processor programmed to control the movement of the first movable stage and the second movable stage, wherein, during operation of the apparatus, the processor moves the first movable stage and the second movable stage towards the fiber.

14 Claims, 8 Drawing Sheets

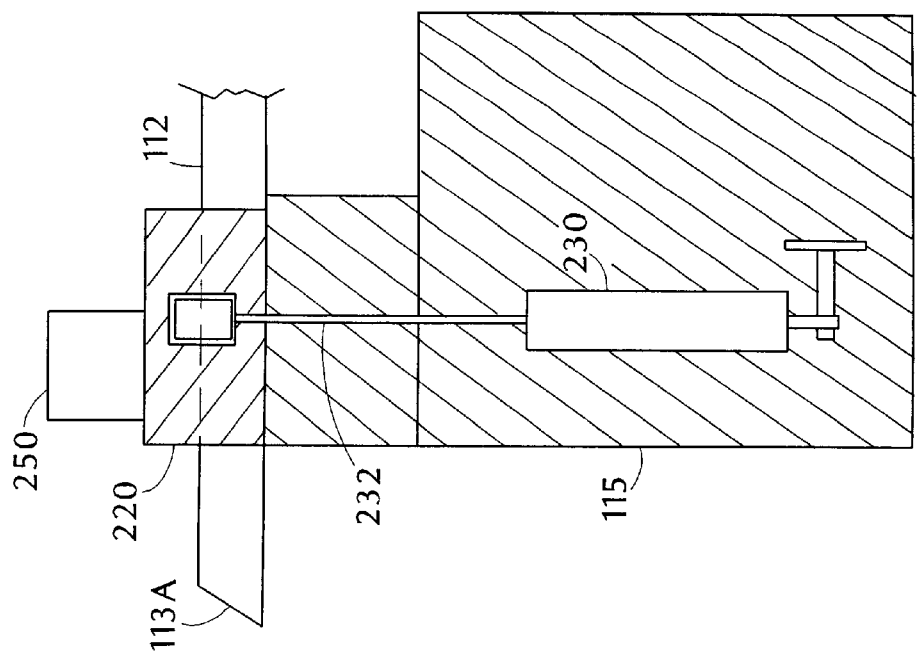
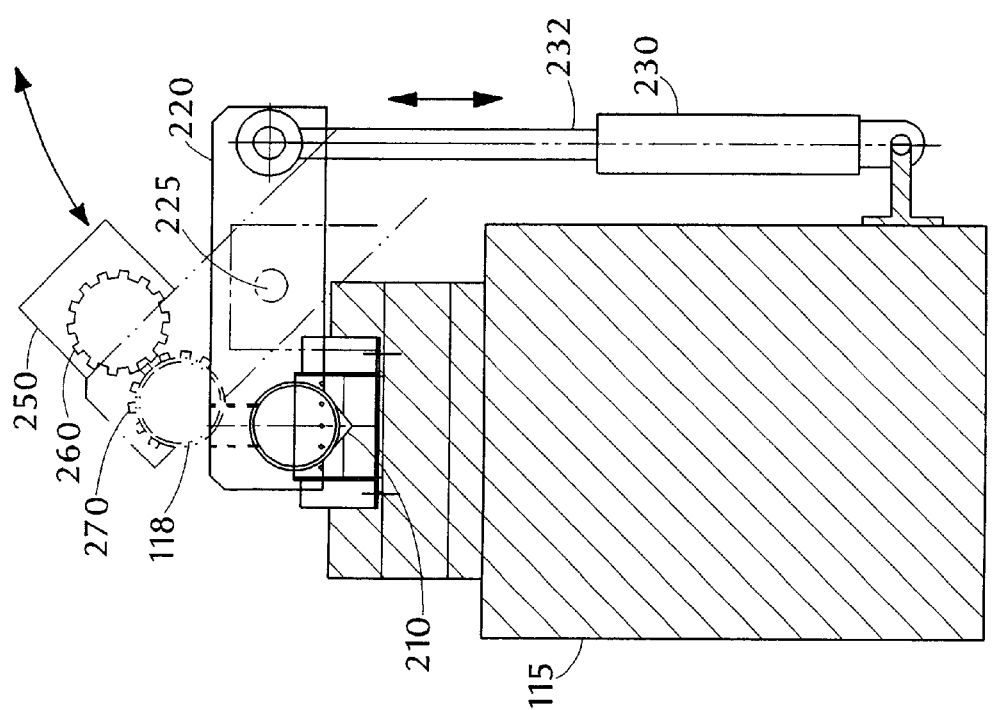
FIG. 2B
FIG. 2A

FIBER TO OPTICAL DEVICE ALIGNMENT

CLAIM OF PRIORITY

This application claims priority under 35 USC §119(e) to U.S. patent application Ser. No. 60/224,735, filed on Aug. 11, 2000, the entire contents of which are hereby incorporated by reference.

TECHNICAL FIELD

This invention relates to aligning a fiber to an optical device.

BACKGROUND

Fiber optic systems often require aligning an optical fiber ("a fiber") to couple light to an optical device, such as a laser diode or an electro-optical detector. Fibers and optical devices have very small emitting and receiving areas, sometimes as small as a few microns in diameter. Therefore, achieving an efficient coupling between a fiber and an optical device requires an alignment with sub-micron accuracy. Typically, the alignment is performed manually, by an operator, who adjusts the position of the fiber while observing the fiber with an observation station (i.e., a high-resolution camera or microscope) or while monitoring a measured output signal from the optical device. Manual alignment is very time consuming and the resulting alignment is dependent on the accuracy and skill of the individual operator.

SUMMARY

According to an aspect of this invention, an apparatus for aligning a fiber to an optical device includes a base, a fiber holder mounted on the base, the fiber holder holding the fiber during operation of the apparatus, a first movable stage mounted on the base, the first movable stage holding the optical device during operation of the apparatus, a second movable stage mounted on the base, wherein the second movable stage is configured to move parallel to the first movable stage, a fiber positioner attached to the second movable stage, and a processor programmed to control the movement of the first movable stage and the second movable stage, wherein, during operation of the apparatus, the processor moves the first movable stage and the second movable stage towards the fiber.

One or more of the following features may also be included: during operation of the apparatus, the processor moves the first movable stage and the second movable stage towards the fiber until the end of the fiber is proximate to the optical device, the fiber positioner may include a movable arm having a range of motion orthogonal to the longitudinal axis of the fiber held in the fiber holder, wherein the processor is programmed to control the movement of the movable arm, and wherein, during operation of the apparatus, the processor moves the movable arm and positions an end of the fiber proximate to the optical device, the apparatus may include a signal generation circuit transmitting a test signal to one of the optical device and the fiber, and a signal detection circuit receiving a detected test signal from one of the optical device and the fiber, wherein the processor is programmed to determine the optimum position of the fiber to maximize a strength of the detected signal, the apparatus may include a support member attached to the base, and a camera mounted to the support member, the camera having a focal plane proximate to the end of the fiber, and, wherein the processor is programmed to determine the coordinates of the end of the fiber that is being aligned to the optical device, and, wherein the movable arm further includes a fiber-guide holding device attached to an end of the movable arm, wherein, during operation of the apparatus, the fiber-guide holding device holds the fiber-guide using forces associated with a flow of air, and, wherein the movable arm further includes a fiber-guide holding device attached to an end of the movable arm, wherein the fiber-guide holding device is a clamping device, and, wherein the optical device is mounted within a device box, and wherein the device box has an opening in a side of the device box that is in substantial alignment with the optical device, and apparatus may further include a third movable stage mounted to the support member and holding an adhesive applicator, wherein, during operation of the apparatus, the adhesive applicator holds an adhesive, and wherein the processor is programmed to control the movement of the third movable stage and programmed to control the dispensing of the adhesive proximate to at least one of the fiber, the fiber-guide and the device box, and apparatus may further include an adhesive applicator attached to the second movable stage, wherein, during operation of the apparatus, the adhesive applicator holds an adhesive, and, wherein the processor is programmed to control the dispensing of the adhesive proximate to at least one of the fiber, the fiber-guide and the opening in the side of the device box, and the apparatus may further include a third movable stage mounted to the support member and holding an adhesive applicator, wherein, during operation of the apparatus, the adhesive applicator holds an adhesive, and wherein the processor is programmed to control the movement of the third movable stage and programmed to control the dispensing of the adhesive proximate to at least one of the fiber and the fiber-guide, and, wherein the fiber holder includes a fiber rotator for rotating the fiber about its longitudinal axis, and wherein the processor is programmed to rotate the fiber until the detected test signal is maximized.

According to a further aspect of this invention, an apparatus for aligning a fiber to an optical device includes a base, a fiber holder mounted on the base, the fiber holder holding the fiber during operation of the apparatus, a first movable stage mounted on the base, the first movable stage holding the optical device during operation of the apparatus, a support member attached to the base, a camera mounted to the support member, the camera having a focal plane proximate to an end of the fiber that is being aligned to the optical device, and a processor programmed to control the movement of the first movable stage, wherein, during operation of the apparatus, the first movable stage is moved towards the fiber.

One or more of the following features may also be included: wherein the processor is programmed to determine the coordinates of the end of the fiber that is being aligned to the optical device, and, wherein the optical device is mounted within a device box, and wherein the device box has a feed-through opening in a side of the device box that is in substantial alignment with the optical device, and the apparatus may further include a signal generation circuit transmitting a test signal to one of the optical device and the fiber, and a signal detection circuit receiving a detected test signal from one of the optical device and the fiber, wherein the processor is programmed to determine the optimum separation distance between the fiber and the optical device to maximize a strength of the detected signal, and, wherein the fiber holder includes a fiber rotator for rotating the fiber about its longitudinal axis, and wherein the processor is programmed to rotate the fiber until the detected test signal is maximized.

According to a further aspect of this invention a method of aligning a fiber to an optical device includes holding a fiber in a fixed position, holding an optical device on a first movable stage, holding a fiber-guide on a second movable stage, and moving the optical device and the go fiber-guide towards the fiber, wherein the moving the optical device and the fiber-guide towards the fiber comprises controlling the moving with a processor.

One or more of the following features may also be included: wherein the holding a fiber-guide further includes holding the fiber-guide with a movable arm having a range of motion orthogonal to the longitudinal axis of the fiber, and moving the fiber-guide proximate to the optical device under control of the processor, the method may further include transmitting a test signal to one of the fiber and the optical device, receiving a signal from one of the fiber and the optical device, and determining the optimum position of the fiber with the processor, the determining based on a signal strength of the received signal, and, wherein holding a fiber in a fixed position further includes holding an end of the fiber in a focal plane of a camera, the method may further include determining coordinates of the end of the fiber with the processor, the determining the coordinates based on an output signal from the camera, and, wherein holding the fiber-guide further includes holding the fiber-guide with a force associated with a flow of air, and, wherein holding the fiber-guide further includes holding the fiber-guide with a clamping force, and, wherein the optical device is mounted within a device box, wherein the device box has an opening in the side of the device box, and wherein holding the device box further includes holding the device box with the opening in substantial alignment with the longitudinal axis of the fiber, the method may further include dispensing adhesive proximate to one of the fiber-guide, the fiber and the optical device, wherein the dispensing adhesive may further include moving an adhesive applicator under control of the processor, and dispensing adhesive from the applicator under control of the processor, the method may further include rotating the fiber with a fiber rotator under control of the processor, and determining, by the processor, the optimum rotational position of the fiber based on a signal strength of the received signal.

According to a further aspect of this invention a method of aligning a fiber to an optical device includes holding a fiber in a fixed position, wherein an end of the fiber is located in a focal plane of a camera, holding an optical device on a first movable stage, moving the optical device towards the fiber, the moving comprises controlling the moving with a processor.

One or more of the following features may also be included: determining coordinates of the end of the fiber with the processor, the determining based upon an output signal from the camera, and, wherein the optical device is mounted within a device box, wherein the device box has an opening in the side of the device box, and wherein holding the device box further includes holding the device box with the opening in substantial alignment with the longitudinal axis of the fiber, the method may further include transmitting a test signal to one of the fiber and the optical device, receiving a signal from one of the fiber and the optical device, and determining the optimum position of the fiber with the processor, the determining based on a signal strength of the received signal, the method may further include rotating the fiber with a fiber rotator under control of the processor, and determining, by the processor, the optimum rotational position of the fiber based on a signal strength of the received signal.

Embodiments of the invention may have one or more of the following advantages. For example, the use of automated movers reduces the manual handling of a fiber during alignment to an optical device and reduces the time required to perform an alignment. Holding the fiber stationary while moving the optical device into alignment reduces the stresses applied to the fiber, reduces the possibility of damaging the fiber and reduces possible fluctuations in a light beam emitted from the fiber (i.e. the intensity or phase of the emitted light beam). Holding the fiber stationary also reduces the complexity, and therefore the cost, of the apparatus by requiring fewer movable stages. Some of the embodiments include a camera that is held stationary and with a fixed focal plane near the end of the fiber that is being held stationary while the optical device is being aligned with it. This eliminates the need to move the camera to track the end of the fiber during the alignment. In some embodiments a fiber rotator is used to rotate a fiber along its longitudinal axis, therefore setting the polarity of the fiber end to match the polarity of the optical device. This fiber rotator may also include a clamping mechanism for holding the fiber. In some embodiments adhesive is dispensed before or after the fiber is aligned to the optical device.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2A shows a side view of a fiber holder with rotating mechanism;

FIG. 2B shows a front view of a fiber holder with rotating mechanism;

Like reference symbols in the various drawings indicate like elements.

DETAILED DESCRIPTION

Figure 1A:
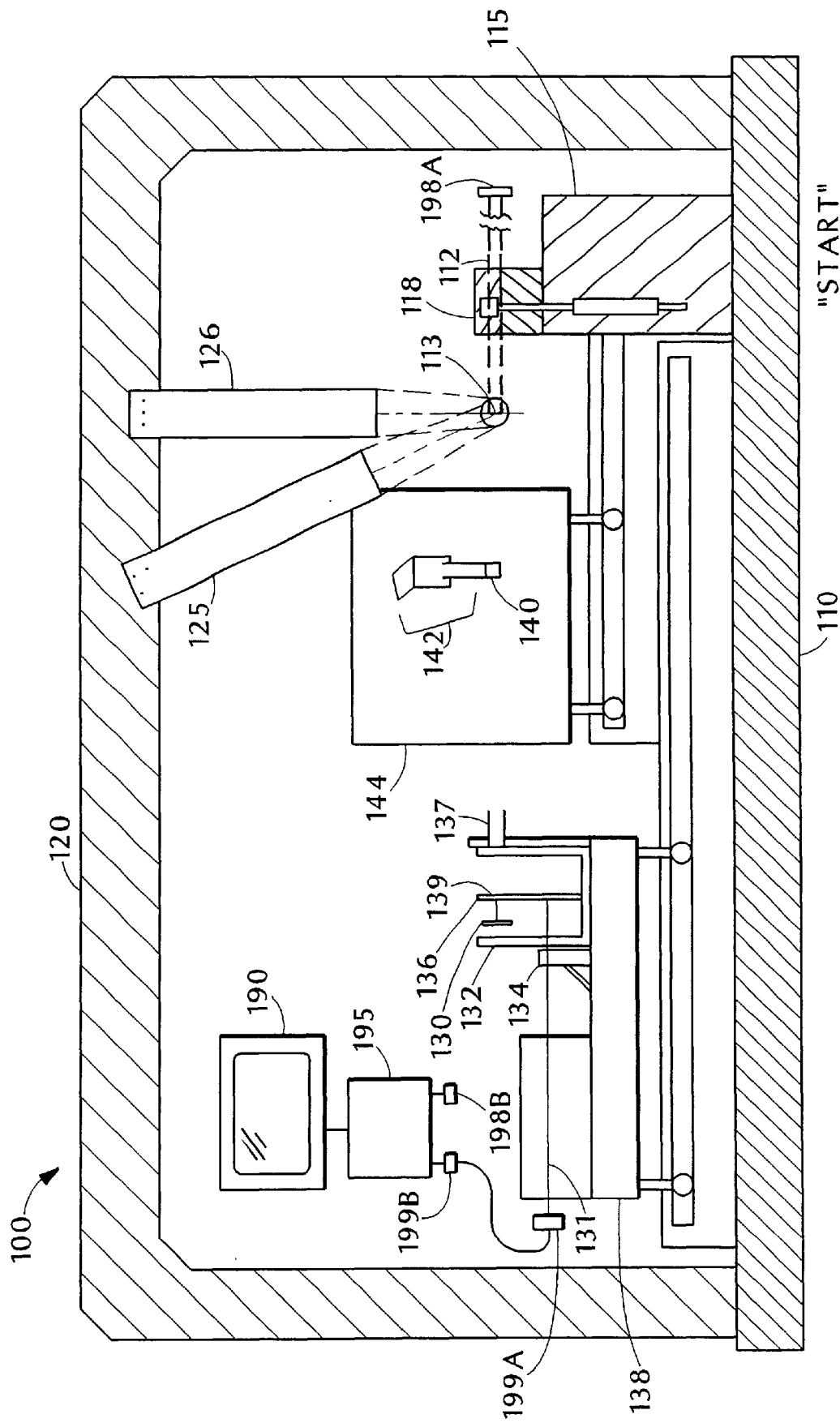
FIG. 1A shows a side view of a fiber to optical device alignment system in a start position.
Figure 1B:
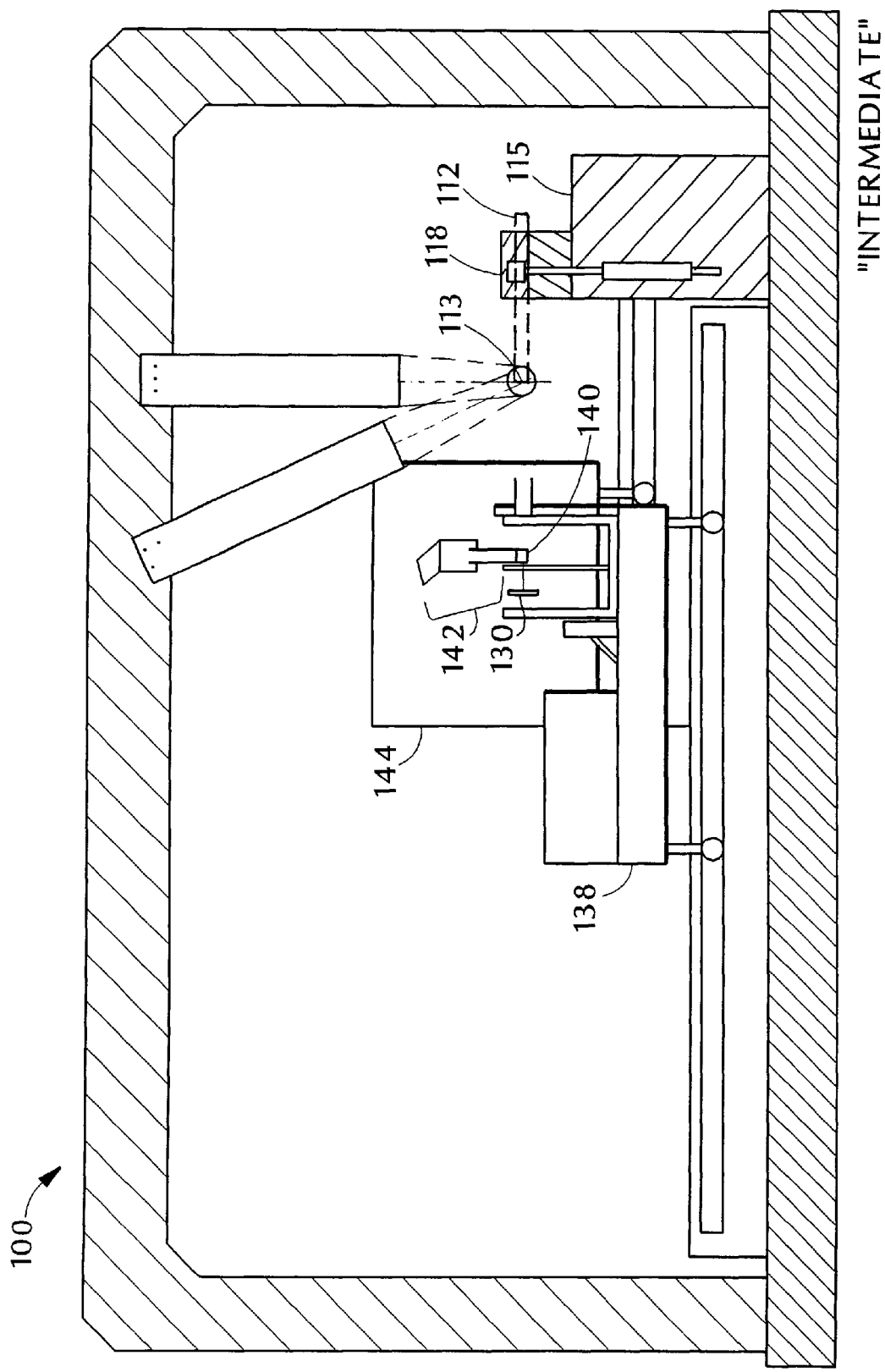
FIG. 1B shows the fiber to optical device alignment systems of FIG. 1 in an intermediate position.
Figure 1C:
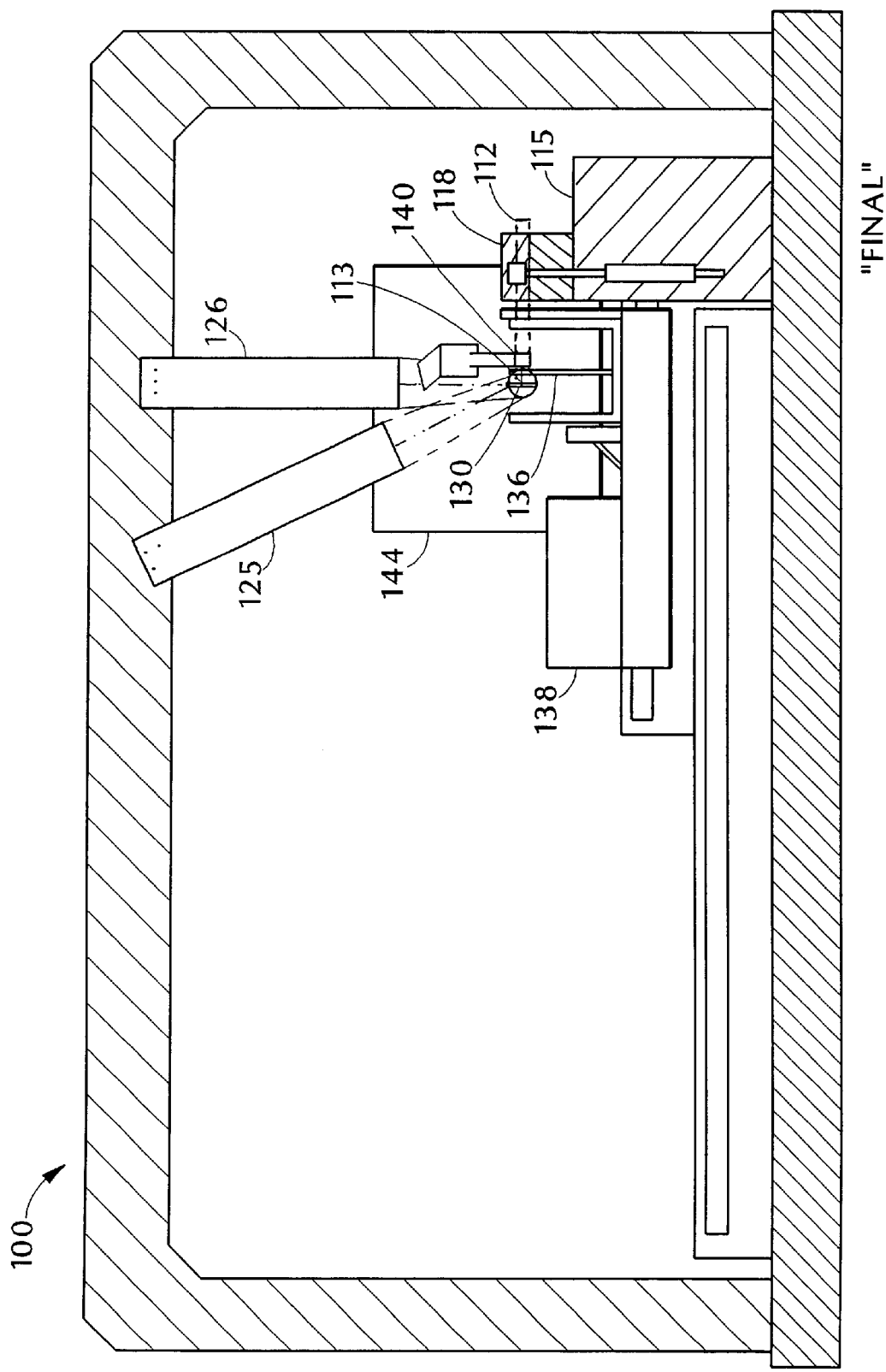
FIG. 1C show the fiber to optical device alignment system of FIG. 1 in a final alignment position.

Referring to FIGS. 1A–1C, a fiber to optical device alignment system 100 automatically aligns a stationary optical fiber 112 to an optical device 130 by moving a device box 132, which contains an optical device 130, and a capillary-shaped fiber-guide 140 held proximate to the device, towards fiber 112. System 100 includes a base 110, a fiber holder 115 mounted on base 110 and an overhead support member 120 mounted on base 110. Two cameras 125 and 126 are mounted approximately 90° apart from each other to overhead support member 120 and have fixed focal planes proximate to the fiber tip 113 held in fiber holder 115. System 100 includes a device carrier 138 for holding and moving optical device 130 towards fiber 112 and a fiber-guide holder 142 mounted to a fiber-guide carrier 144 for holding and moving fiber-guide 140 in-line with optical device 130 and fiber 112. Both device carrier 138 and fiber-guide carrier 144 are constructed from "single-axis stages", i.e., automated platforms ("stages") that are movable in a single-axis, in this case, allowing device carrier 138 and fiber-guide carrier 144 to move in the same axis as the longitudinal axis of fiber 112. Fiber-guide holder 142 includes an extendible arm with a fiber-guide clamp attached to the end of the arm for holding a fiber-guide 140. The extendible arm moves orthogonally to the longitudinal axis of fiber 112, therefore, extendible arm can move fiber-guide 140 and fiber tip 113 orthogonally to the surface of optical device 130 facing fiber tip 113 (see FIG. 1C).

The system includes a computer processor 190 that has a memory, executable programs and input/output capabilities. Computer processor 190 is connected to receive inputs from cameras 125 and 126; the camera inputs are used by computer processor 190 to determine the location of fiber tip 113 relative to optical device 130, as will be explained. Computer processor 190 also controls the movements of device carrier 138, fiber-guide carrier 144 and the extendible arm of fiber-guide holder 142.

Referring to FIGS. 1A–2, to operate system 100, an operator places device box 132 against an adjustable stop 134 on device carrier 138. Adjustable stop 134 allows different-sized device boxes to be mounted to device carrier 138. Device box 132 includes optical device 130 mounted to a support 136 within device box 132 and also includes a feed-through tube 137 in a side of device box 132 that is roughly in-line with optical device 130 and a through-hole 139 in upright 136. The operator then loads fiber 112 into fiber holder 115 by positioning fiber 112 length-wise into a v-groove 210 formed in the longitudinal center of the bottom of fiber holder 115 (see FIG. 2). V-groove 210 is mechanically referenced to optical device 130, therefore the vertical position of fiber 112 relative to optical device 130 is roughly established. The operator roughly establishes the horizontal position of fiber tip 113 relative to optical device 130 by placing fiber tip 113 in the center of the field of view of cameras 125 and 126 when placing fiber 112 and before clamping fiber 112 into fiber holder 115.

With optical device 130 and fiber 112 loaded on apparatus 100, computer processor 190 executes an object recognition algorithm that determines the orthogonal coordinates of fiber tip 113 from the inputs received from cameras 125 and 126. Computer processor 190 then moves device carrier 138 into an "intermediate position" (see FIG. 1B). When device carrier 138 has moved into the intermediate position, computer processor 190 extends fiber-guide holder 142 into device box 132 to hold the center of fiber-guide 140 in the determined vertical position of fiber 112. Computer processor 190 then moves device carrier 138 and fiber-guide carrier 144 simultaneously towards fiber 112 until feed-through tube 137 and fiber-guide 140 are slid over fiber tip 113, thereby moving fiber tip 113 next to optical device 130 ("final position", see FIG. 1C). Fiber tip 113 will now be roughly aligned to optical device 130 and close enough to optical device 130 to ensure that some light from fiber 112 will couple into device 130. At this point, computer processor 190 executes an active feedback algorithm and moves fiber-guide holder 142 so as to more closely align fiber tip 113 and device 130, as will be explained.

Referring again to FIG. 1A, system 100 includes a signal detection and signal generation circuit 195 that is controlled by computer processor 190. Circuit 195 has two input/output ports 198B and 199B connected to fiber 112, at connector 198A, and optical device 130, at connector 199A, respectively (the connection between 198A and 198B is not shown). If optical device 130 is a transmitting device, circuit 195 outputs a generated signal through port 199A that causes the optical device 130 to output a signal to fiber 112 that is received as a detected signal on port 198B. However, if optical device 130 is a receiving device, circuit 195 outputs a generated signal through port 198B and receives a detected signal through port 199B. At this point, computer processor 190 executes an active feedback control algorithm that moves the fiber-guide 140 and fiber tip 113 to hunt for and converge upon the location of fiber tip 113 that maximizes the detected signal, and therefore, maximizes the coupling of light between the optical device 130 and the fiber tip 113.

Referring to FIGS. 2A and 2B, fiber holder 115 includes a fiber rotator 118 (for example, a "theta-wheel" clamp) that is controlled by computer processor 190. Fiber rotator 118 holds fiber 112 in a fixed horizontal position relative to base 110 but also may rotate fiber 112 about its longitudinal axis to adjust the orientation of the polarity of fiber tip 113 relative to device 130. Fiber rotator 118 is mounted near one end of an arm 220. Arm 220 has a pivot pin 225 in the center of the arm 220 connected to fiber holder 115, and a linear actuator 230 (for example, a pneumatic cylinder) connected to the opposite end of arm 220 from fiber rotator 118, allowing fiber rotator 118 to open and close by retracting and extending piston 232. As discussed previously, v-groove 210 is formed in the longitudinal center of the bottom surface of fiber holder 115 and is used to establish the vertical position of fiber 112 relative to optical device 130. A servo-motor 250 is connected to fiber rotator 118 through gears 260 and 270. The servo-motor is coupled to computer processor 190, and when activated by computer processor 190 servo-motor 250 causes fiber rotator 118 to rotate about its longitudinal axis, thereby rotating fiber 112 and fiber tip 113 about the longitudinal axis of fiber 112.

Referring again to FIG. 2B, in some cases, fiber tip 113A may require longitudinal alignment to optical device for optimum performance. For example, fiber tip 113A may be angled to achieve a reduction in possible back reflection from the end of fiber 112 of a light beam leaving fiber 112. Or, fiber tip 113A may be "lensed", i.e., having a lens attached or formed at fiber tip 113A. In addition, optical device 130 may be mounted at an angle relative to the longitudinal axis of fiber 112 so that any light that might be reflected back off optical device 130 will not re-enter fiber 112. To minimize the back-reflected light between fiber tip 113 and an angular-mounted optical device 130, computer processor 190 uses an active feedback control algorithm to rotate fiber 112 and fiber tip 113 until the back-reflected signal is minimized.

Figures 3A, 3B:
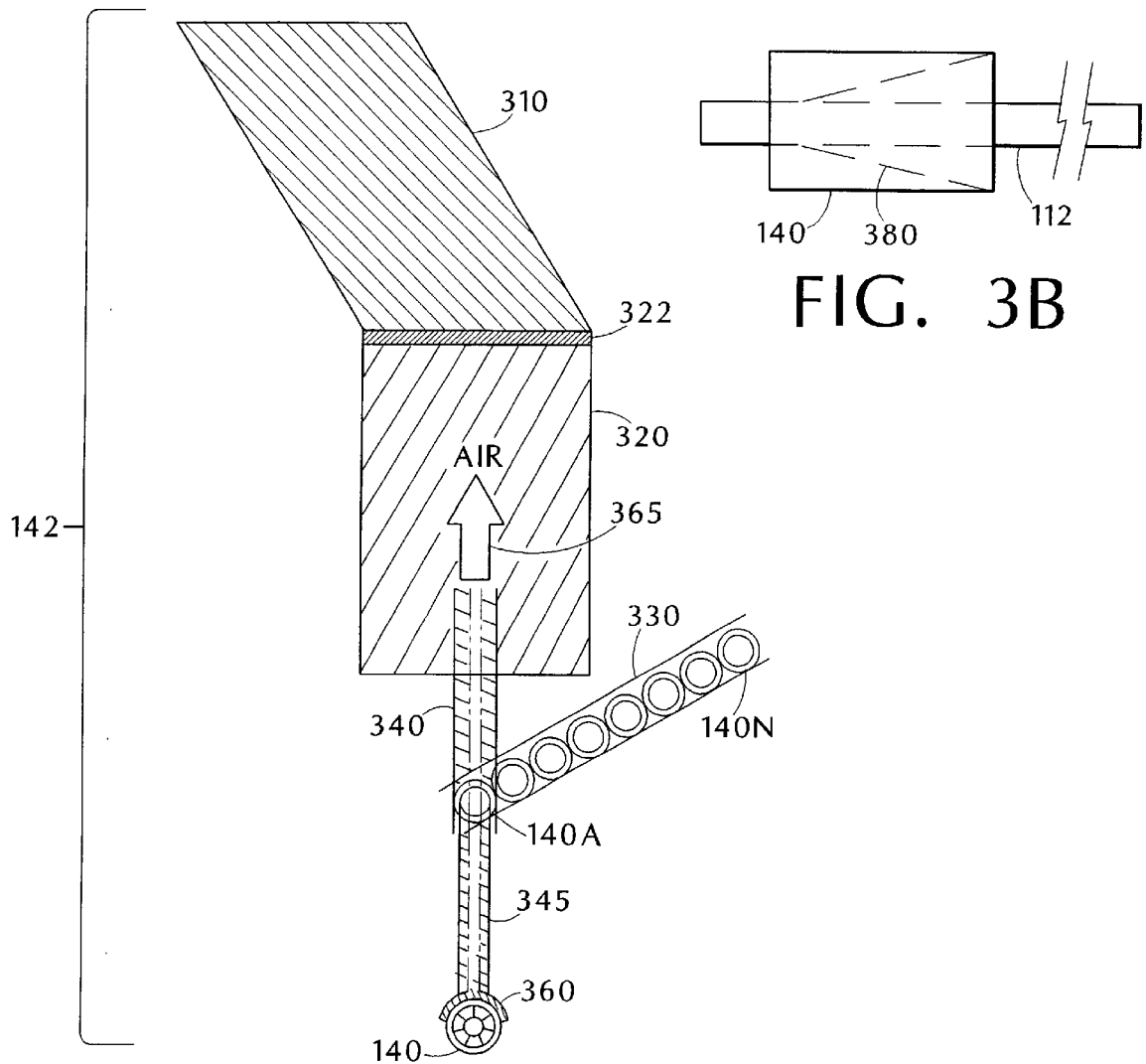
FIG. 3A shows a front view of a fiber-guide holder holding a fiber-guide.
FIG. 3B shows a side cross-sectional view of the fiber-guide of FIG. 3A with a fiber inserted.

Referring to FIG. 3A, fiber-guide holder 142 includes upper arm 310 and lower arm 320 connected by pivot joint 322. Lower arm 320 is a linear actuator that includes piston guide frame 340 and extendible piston 345 with fiber-guide clamp 360 connected to the end of piston 345. A fiber-guide tray feeder 330 is attached to piston guide frame 340, which automates the loading of fiber-guides 140A–140N into fiber-guide clamp 360. More specifically, under control of computer processor 190, piston 345 extends or retracts, causing fiber-guide clamp 360 to load a successive fiber-guide 140A–140N, with each extension of piston 345.

Referring to FIGS. 3A and 3B, fiber-guide 140 is cylindrically-shaped and has a tapered central region 380 into which fiber 112 is inserted through the wider end and out the narrower end. Fiber-guide clamp 360 has a semi-circular shape that conforms to the outside of fiber-guide 140. An airflow 365, up through piston 345 and cylinder 320 holds fiber-guide 140 in clamp 360.

Figure 3C:
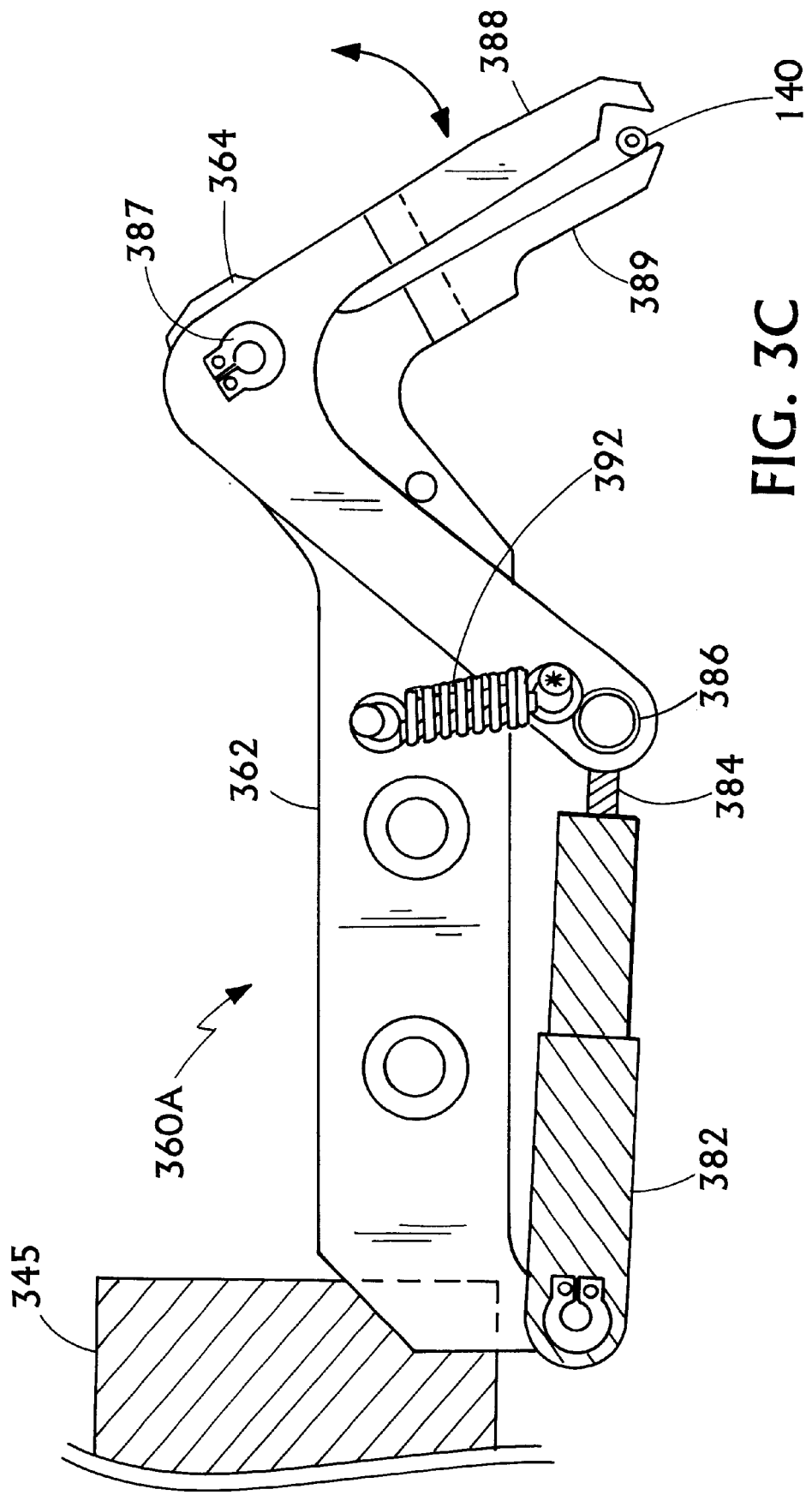
FIG. 3C shows a side view of a second embodiment of a fiber-guide holder clamp holding a fiber-guide.
Figure 3D:
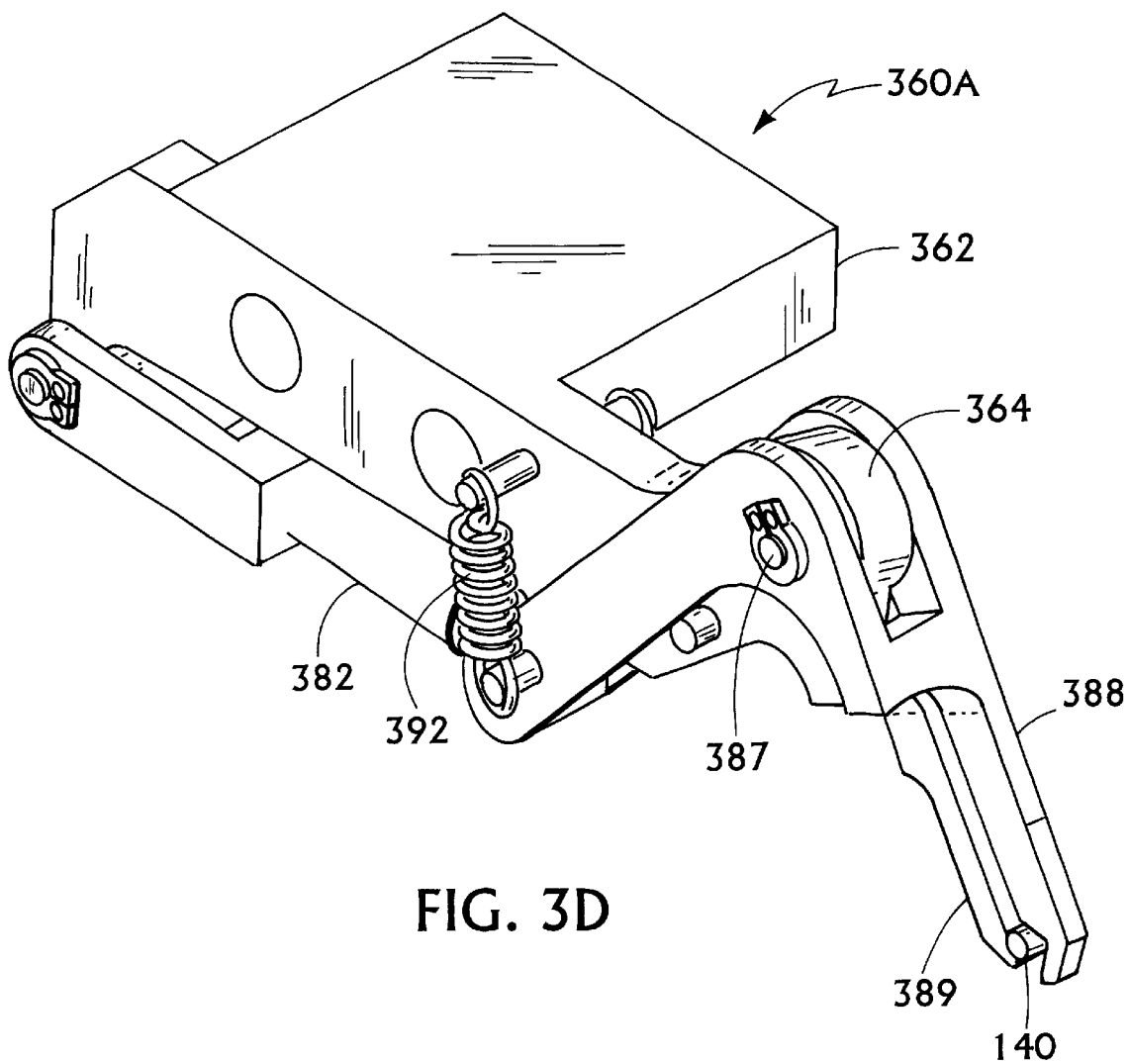
FIG. 3D shows another view of the fiber-guide holder clamp of FIG. 3C.

Referring to FIGS. 3C and 3D, an alternative fiber-guide clamp 360A includes a frame member 362 with an angled portion 364 an opposing arm 389 and a clamping arm 388. Clamping arm 388 is connected to frame 362 via a pivot pin 387 through angled portion 364. A closing spring 392 is connected between clamping arm 388 and frame member 362. A linear actuator 382 with an extendible piston 384 is connected to one end of clamping arm 388 via connecting pin 386. When air pressure is released from cylinder 382, piston 384 is retracted into cylinder 382 and clamping arm 388 pivots towards opposing arm 389 to clamp and hold fiber-guide 140 under forces applied by spring 392.

Figure 4:
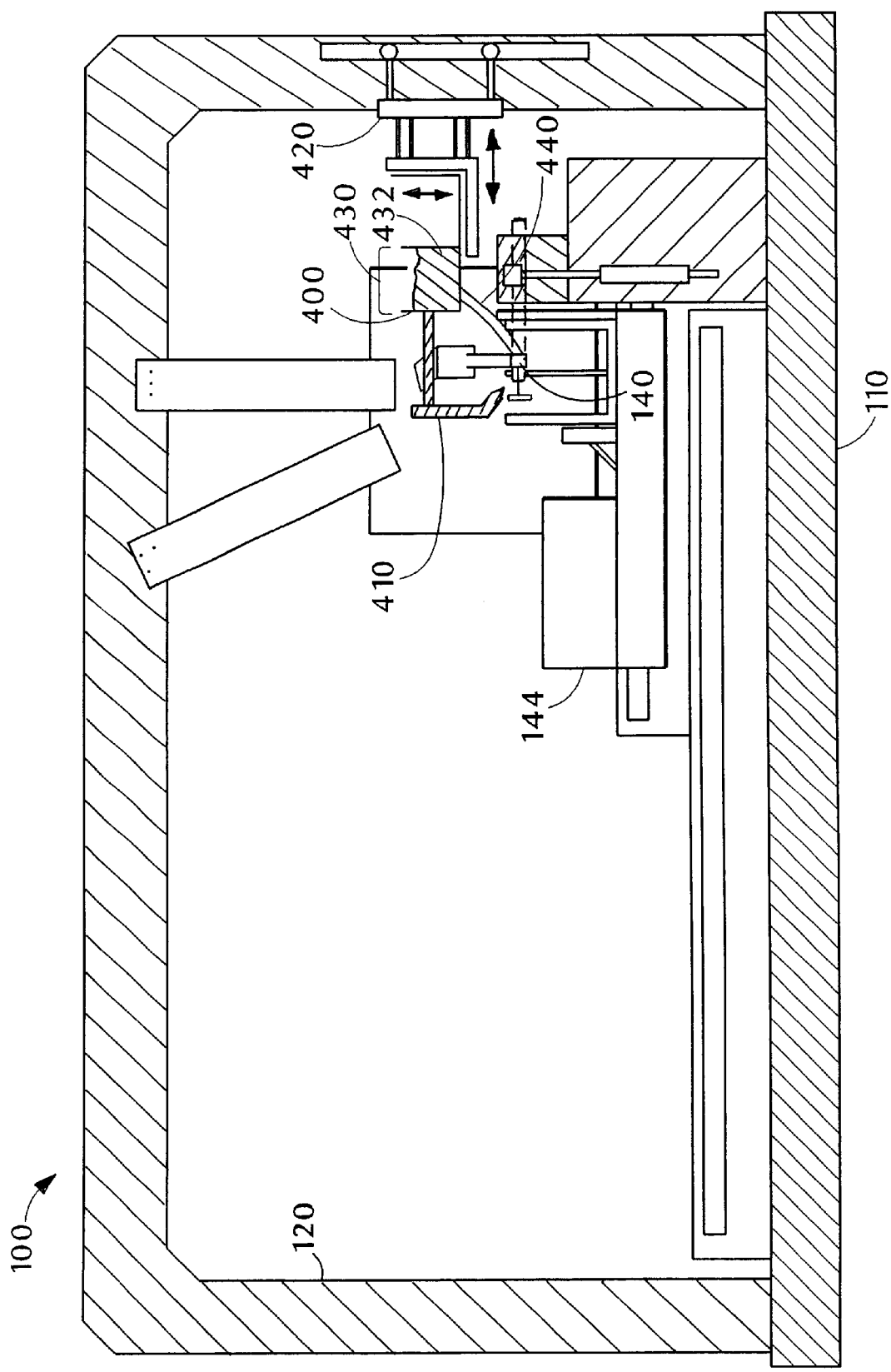
FIG. 4 shows an adhesive applicator and ultra-violet curing light attached to the system of FIG. 1.

Referring to FIG. 4, system 100 may also include an adhesive applicator 400 and an ultra-violet light 410 to apply to and cure, respectively, an adhesive 432 to fiber 112 and fiber-guide 140 to bond them in position after final alignment of fiber tip 113 to optical device 130. Adhesive applicator 400 and ultra-violet curing light 410 are mounted on a three-axis stage 420 that is mounted to overhead support member 120. Three-axis stage 420 is an automated platform that is movable in all three orthogonal directions, in this case, allowing adhesive applicator 400 and ultra-violet curing light 410 to move into area adjacent to device box 132, optical device 130 and fiber 112. Adhesive applicator 400 includes an applicator tip 440 connected to an adhesive reservoir 430 containing a ultra-violet cured epoxy 432. Computer processor 190 controls the movements of three-axis stage 420 and also controls the dispensing of adhesive 432 from the adhesive reservoir 430. In operation, adhesive applicator 400 and curing light 410 are lowered by stage 420 until applicator tip 440 is proximate to fiber-guide 140 and fiber 112. Adhesive 432 is injected through applicator tip 440 into fiber-guide 140, then curing light 410 is turned on for an appropriate period of time to bond fiber 112 to fiber-guide 140, and to bond fiber-guide 140 to upright 136. Three-axis stage 420 allows applicator 400 and curing light 410 to be moved to other locations proximate to device box 132 for applying and curing adhesive 432. For instance, adhesive 432 may also be applied to feed-through tube 137 to prevent water or contaminants from entering device box 132. In some applications, fiber-guide 140 must have adhesive 432 applied between fiber-guide 140 and upright 136 before fiber 112 is inserted into fiber-guide 140. In this case, adhesive applicator 400 is lowered into the device box 132, proximate to upright 136 and dispenses adhesive 432 to upright 136 before the fiber-guide 140 is positioned into device box 132.

Following the application and curing of adhesive 432, adhesive applicator 400 and curing light 410 are retracted from device box 132. Fiber-guide holder 142 is also retracted from device box 132, allowing removal of device box 132 and fiber 112 from system 100.

Though we have described specific embodiments, we do not intend to imply that there are not other ways to implement some of the features of those embodiments. For example, we mentioned using computer processor 190 to move various elements in the system. However, an operator could move those elements manually using the observation cameras 125 and 126. The exterior shape of the fiber-guide 140 could be something other than cylindrical and, therefore, the fiber-guide clamp could be modified to hold other fiber-guide shapes. We also described manually loading the fiber and the device box into the system, however, one or both of these loading procedures could be automated using an appropriate automated parts handling system. We mentioned ultra-violet cured epoxy as the means by which various elements are attached to each other. However, any appropriate method which affixes one element to another could be used, such as fusing or soldering. We mentioned using UV curable adhesive to create an environmental seal between the fiber and the device feed-through tube, however, any appropriate material (adhesive or solder), or method (thermal cure, soldering or welding), for sealing feed-through could be used. We described the alignment of a fiber to an optical device that is mounted to an upright inside the device box. However, other mounting relationships of the optical device to the device carrier, with or without a device box, could be used with the system. The mounting of one or more of the cameras could be made directly to the base, that is, without the use of the support member.

The two cameras 125 and 126 do not necessarily have the same resolution, that is, one camera could have a higher resolution than the other camera, with the higher resolution camera being used to monitor the alignment of the fiber tip to the optical device. Also, the separation distance between the fiber tip and the optical device could be determined using the higher resolution camera, by having the computer processor execute an object recognition algorithm using the signal inputs from the higher resolution camera. We mentioned determining the coordinates of the fiber tip by having the operator roughly establishing the horizontal position of the fiber tip in the focal plane of cameras 125 and 126, then executing an object recognition algorithm. In some applications, the processor 190 may rotate the fiber with the fiber rotator to cause the fiber tip to come into the focal plane of both cameras 125 and 126 before executing the object recognition algorithm. Furthermore, a third camera (not shown) could be mounted orthogonal to cameras 125 and 126 and used along with cameras 125 and 126 to determine the coordinates of fiber tip 113 with or without rotating fiber 112.

We described the fiber-holder being mounted on a movable fiber-guide carrier, however, the fiber-guide holder could be mounted in a stationary position next to the fiber holder. In this case, the processor would first move the device carrier towards the fiber until the feed-through tube is slid over the fiber, at which point the processor would move the fiber-guide holder into the device box. Then the processor would move the device carrier towards the fiber causing the fiber-guide to be slid over the fiber and bringing the optical device and the fiber-guide next to the fiber tip.

We described the device carrier being constructed from a single-axis stage, and having a single-axis of motion, i.e., towards the longitudinal axis of a fiber held by the fiber holder. However, the device carrier could be constructed from a multiple-axis stage that could move towards the fiber in the first axis, and then could move the optical device orthogonally from the longitudinal axis of the fiber and into final alignment with the fiber. In this case, the fiber-guide holder would not be required to move the fiber into final alignment with the optical device. Furthermore, the multiple axis stage could be configured to have other ranges of motion, for instance pitch, roll and yaw movements, and could therefore pitch, roll or yaw the optical device relative to the fiber tip.

We described the adhesive applicator as being mounted on a three-axis stage that was attached to the support member. However, the adhesive applicator could be mounted on a one-axis or two-axis stage that is attached to the fiber-guide carrier. In this case, the fiber-guide carrier could move the adhesive applicator in one axis, towards the fiber, and the one-axis or two-axis stage could move the adhesive applicator orthogonally from the longitudinal axis of the fiber, therefore, moving the adhesive applicator near the optical device, the fiber or the feed-through tube.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for aligning a fiber to an optical device comprising:
    a base;
    a fiber holder mounted on said base, said fiber holder holding the fiber during operation of the apparatus;
    a first movable stage mounted on said base, said first movable stage holding the optical device during operation of the apparatus;
    a second movable stage mounted on said base, wherein said second movable stage is configured to move parallel to said first movable stage;
    a fiber positioner attached to said second movable stage;
    an adhesive applicator attached to said second movable stage, wherein, during operation of the apparatus, the adhesive applicator holds an adhesive, and
    a processor programmed to control the movement of said first movable stage and said second movable stage and the dispensing of the adhesive,
    wherein, during operation of the apparatus, said processor moves said first movable stage and said second movable stage towards the fiber.

2. The apparatus of claim 1, wherein, during operation of the apparatus, said processor moves the first movable stage and the second movable stage towards the fiber until the end of the fiber is proximate to the optical device.

3. The apparatus of claim 2, wherein said fiber positioner further comprises:
    a movable arm having a range of motion orthogonal to the longitudinal axis of the fiber held in said fiber holder, wherein the processor is programmed to control the movement of said movable arm, and
    wherein, during operation of the apparatus, said processor moves the movable arm and positions an end of the fiber proximate to the optical device.

4. The apparatus of claim 3 further comprises:
    a signal generation circuit transmitting a test signal to one of the optical device and the fiber; and
    a signal detection circuit receiving a detected test signal from one of the optical device and the fiber,
    wherein said processor is programmed to determine the optimum position of the fiber to maximize a strength of the detected signal.

5. The apparatus of claim 4 further comprises:
    a support member attached to said base; and
    a camera mounted to said support member, said camera having a focal plane proximate to the end of the fiber.

6. The apparatus of claim 5, wherein said processor is programmed to determine the coordinates of the end of the fiber that is being aligned to the optical device.

7. The apparatus of claim 3, wherein said movable arm further comprises:
    a fiber-guide holding device attached to an end of said movable arm, wherein, during operation of the apparatus, the fiber-guide holding device holds a fiber-guide using forces associated with a flow of air.

8. The apparatus of claim 3, wherein said movable arm further comprises:
    a fiber-guide holding device attached to an end of said movable arm, wherein said fiber-guide holding device is a clamping device.

9. The apparatus of claim 3, wherein the optical device is mounted within a device box, and wherein the device box has an opening in a side of the device box that is in substantial alignment with the optical device.

10. The apparatus of claim 9 wherein said processor is programmed to control the dispensing of the adhesive proximate to at least one of the fiber, the fiber-guide and the opening in the side of the device box.

11. The apparatus of claim 3 wherein said processor is programmed to control the movement of said third movable stage and programmed to control the dispensing of the adhesive proximate to at least one of the fiber and the fiber-guide.

12. An apparatus for aligning a fiber to an optical device comprising:
    a base;
    a fiber holder mounted on said base, said fiber holder holding the fiber during operation of the apparatus;
    a first movable stage mounted on said base, said first movable stage holding the optical device during operation of the apparatus;
    a second movable stage mounted on said base, wherein said second movable stage is configured to move parallel to said first movable stage;
    a fiber positioner attached to said second movable stage;
    a third movable stage coupled to said base and holding an adhesive applicator, wherein, during operation of the apparatus, the adhesive applicator holds an adhesive; and
    a processor programmed to control the movement of said first movable stage, said second movable stage, and said third movable stage and the dispensing of the adhesive,
    wherein, during operation of the apparatus, said processor moves said first movable stage and said second movable stage towards the fiber.

13. The apparatus of claim 12, wherein the optical device is mounted within a device box, and wherein the device box has an opening in a side of the device box that is in substantial alignment with the optical device.

14. The apparatus of claim 13 wherein said processor is programmed to control the dispensing of the adhesive proximate to at least one of the fiber, the fiber-guide and the device box.

* * * * *

UNITED STATES PATENT AND TRADEMARK OFFICE
CERTIFICATE OF CORRECTION

PATENT NO.      : 6,616,346 B1                                          Page 1 of 1
DATED           : September 9, 2003
INVENTOR(S)     : John L. Sullivan, Jr. et al.

It is certified that error appears in the above-identified patent and that said Letters Patent is hereby corrected as shown below:

Column 3,
Line 5, delete "go" before "fiber-guide"

Column 4,
Line 34, replace "show" with -- shows --

Column 7,
Line 30, after "containing" replace "a" with -- an --

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,616,346 B1  Page 1 of 1
DATED : September 9, 2003
INVENTOR(S) : John L. Sullivan, Jr. et al.

It is certified that error appears in the above-identified patent and that said Letters Patent is hereby corrected as shown below:

<u>Title page,</u>
Item [56], References Cited, U.S. PATENT DOCUMENTS, insert the following references:
-- 5,857,047   *01/05/1999   Strand et al.   385/88
   5,871,559   *02/16/1999   Bloom           65/501
   5,926,594   *07/20/1999   Song et al.     385/49
   5,970,749   *10/26/1999   Bloom           65/378
   6,003,341   *12/21/1999   Bloom           65/484 --

Signed and Sealed this

Twenty-fourth Day of August, 2004

JON W. DUDAS
*Director of the United States Patent and Trademark Office*